(12) United States Patent
Kunda

(10) Patent No.: US 8,297,169 B2
(45) Date of Patent: Oct. 30, 2012

(54) BALLISTIC RESISTANT THROUGH INSERT WITH FLOATING CAPABILITY FOR STOPPING A BALLISTIC PROJECTILE

(75) Inventor: James J. Kunda, Snohomish, WA (US)

(73) Assignee: The Boeing Company, Chicago, IL (US)

(*) Notice: Subject to any disclaimer, the term of this patent is extended or adjusted under 35 U.S.C. 154(b) by 703 days.

(21) Appl. No.: 12/486,633

(22) Filed: Jun. 17, 2009

(65) Prior Publication Data
US 2012/0174765 A1    Jul. 12, 2012

Related U.S. Application Data

(63) Continuation-in-part of application No. 11/475,296, filed on Jun. 26, 2006, now abandoned.

(51) Int. Cl.
*F16B 37/04* (2006.01)
(52) U.S. Cl. ........................... 89/36.11; 411/108
(58) Field of Classification Search ............. 411/108, 411/338; 89/36.02, 36.11
See application file for complete search history.

(56) References Cited

U.S. PATENT DOCUMENTS

| | | |
|---|---|---|
| 1,967,039 A | 7/1934 | Mohr |
| 2,929,426 A | 3/1960 | Hamman |
| 3,339,609 A | 9/1967 | Cushman |
| 4,555,207 A * | 11/1985 | Ferguson .................... 411/6 |
| 4,863,326 A | 9/1989 | Vickers |
| 4,981,735 A | 1/1991 | Rickson |
| 6,264,412 B1 | 7/2001 | Nakamura et al. |
| 6,488,460 B1 | 12/2002 | Smith et al. |
| 6,854,921 B2 | 2/2005 | Melberg et al. |

OTHER PUBLICATIONS

Web page from www.shur-lok.com/contents/products/sandwich. html, entitled "Fasteners for Sandwich Structure," printed Jun. 26, 2006, 1 page.
pp. 18 and 19 from Shur-Lok Corporation catalog, Tenth Ed. 1987, Sur-Lok Corporation, P.O. Box 19584, Irvine, CA 92713-9584, 2 pages.
pp. 18 and 19 from Shur-Lok Corporation catalog, Tenth Ed. 1987, Sur-Lock Corporation, P.O. Box 19584, Irvine, CA 92713-9584, 2 pages.

* cited by examiner

*Primary Examiner* — Michael Carone
*Assistant Examiner* — Reginald Tillman, Jr.
(74) *Attorney, Agent, or Firm* — Klintworth & Rozenblat IP LLC

(57) ABSTRACT

A ballistic resistant through insert with floating capability for stopping a ballistic projectile, comprising at least one of a bullet, a ballistic fragment, and a particle fragment, may comprise a stud, a floating nut, and a cap. The stud may have a flat base portion and a cylindrical stud portion mounted thereon. The cylindrical stud portion may comprise a stud cylinder aperture. The floating nut may be located inside the stud cylinder aperture such that the floating nut floats within the stud cylinder aperture. The cap may have a flat cap portion and a cylindrical cap portion mounted thereon. The cylindrical cap portion may mate with the cylindrical stud portion. The stud may be made of a material for stopping a ballistic projectile. The flat base portion of the stud may have a minimum thickness for stopping a ballistic projectile.

23 Claims, 8 Drawing Sheets

US 8,297,169 B2

BALLISTIC RESISTANT THROUGH INSERT WITH FLOATING CAPABILITY FOR STOPPING A BALLISTIC PROJECTILE

RELATED APPLICATIONS

This application is a continuation-in-part of U.S. patent application Ser. No. 11/475,296, filed on Jun. 26, 2006, which is hereby incorporated by reference.

FIELD OF THE DISCLOSURE

The field of the disclosure relates to ballistic resistant through inserts with floating capabilities for stopping a ballistic projectile comprising at least one of a bullet, a ballistic fragment, and/or a particle fragment occurring due to the detonation of an explosive device.

BACKGROUND OF THE DISCLOSURE

It is often necessary to secure an object, such as a piece of furniture or equipment, to a panel. The panel may comprise a portion of a vehicle such as an aircraft. Some conventional apparatus and/or methods for installing an object to a panel may utilize one or more through inserts or blind inserts. The insert may be installed into the panel, and a fastener may be driven through a hole in the object and into the insert. However, conventional through inserts may not provide the flexibility and strength needed to mount objects to the panel, and may not provide ballistic protection to stop a ballistic projectile fired at the panel, such as a bullet, a ballistic fragment, or a particle fragment occurring due to the detonation of an explosive device.

A conventional through insert may extend through the panel and may have portions contacting both sides of the panel. This may create a high level of structural strength. However, the through insert may not have the capability to float. As a result, if a through insert is installed in a location on the panel that is not precisely aligned with the hole in the object through which the fastener will be driven, the object may not be secured to the through insert. This may necessitate the fabrication of special tooling to control the location of the through insert, large holes in the object to facilitate installation, or the removing and re-installing of the through insert.

A conventional blind insert may be installed from one side of a panel after a hole has been created. The blind insert may be secured within the hole with an adhesive such as a potting compound. Some blind inserts may include an internal floating nut that may allow an object to be attached to the blind insert even if the object is not precisely aligned with the hole. However, the blind insert may not extend all the way through the panel, and as a result, may not provide as much structural strength as a through insert.

Therefore, it would be advantageous to have an apparatus that takes into account at least some of the issues discussed above, as well as possibly other issues.

SUMMARY OF THE DISCLOSURE

In one embodiment, a ballistic resistant through insert with floating capability for stopping a ballistic projectile, comprising at least one of a bullet, a ballistic fragment, and a particle fragment, is provided. The ballistic resistant through insert may comprise a stud, a floating nut, and a cap. The stud may have a flat base portion and a cylindrical stud portion mounted thereon. The cylindrical stud portion may comprise a stud cylinder aperture. The floating nut may be located inside the stud cylinder aperture such that the floating nut floats within the stud cylinder aperture. The cap may have a flat cap portion and a cylindrical cap portion mounted thereon. The cylindrical cap portion may mate with the cylindrical stud portion. The stud may be made of a material for stopping a ballistic projectile. The flat base portion of the stud may have a minimum thickness for stopping a ballistic projectile.

In another embodiment, a vehicle may be disclosed. The vehicle may comprise a panel and an object may be mounted to the panel. The panel may have a ballistic resistant surface comprising a surface material for stopping a ballistic projectile, comprising at least one of a bullet, a ballistic fragment, and a particle fragment. The panel may have a minimum panel thickness for stopping a ballistic projectile. The object may be mounted to the panel with at least one fastener in cooperation with a corresponding number of ballistic resistant through inserts disposed within a corresponding number of holes in the panel. Each ballistic resistant through insert may comprise a stud, a floating nut, and a cap. The stud may have a flat base portion and a cylindrical stud portion mounted thereon. The cylindrical stud portion may comprise a stud cylinder aperture. The floating nut located inside the stud cylinder aperture may float within the stud cylinder aperture. The at least one fastener may be attached to the floating nut. The cap may have a flat cap portion, a flat cap aperture, and a cylindrical cap portion mounted thereon. The at least one fastener may extend through the flat cap aperture. The cylindrical cap portion may mate with the cylindrical stud portion. The stud may be made of a material for stopping a ballistic projectile. The flat base portion of the stud may have a minimum thickness for stopping a ballistic projectile.

In an additional embodiment, a method may be disclosed for securing an object to a panel to provide ballistic resistance from a ballistic projectile comprising at least one of a bullet, a ballistic fragment, and a particle fragment. In one step, a panel may be provided. The panel may have a minimum panel thickness for stopping a ballistic projectile. In another step, a stud may be provided comprising a flat base portion and a cylindrical stud portion mounted thereon. The stud may be made of a material for stopping a ballistic projectile. The flat base portion may have a minimum thickness for stopping a ballistic projectile. The cylindrical stud portion may have a stud cylinder aperture. In an additional step, a cap may be provided comprising a flat cap portion and a cylindrical cap portion mounted thereon. The flat cap portion may have a flat cap aperture. In another step, a hole in the panel may be created. In still another step, the stud may be inserted into the hole in the panel. In an additional step, a floating nut may be placed into the stud cylinder aperture. In another step, the cap may be placed onto the stud. In still another step, a fastener may be extended through a hole in an object, through the flat cap aperture, and through the floating nut. In another step, the floating nut may be floated within the stud cylinder aperture.

One or more embodiments of the disclosure may reduce one or more issues of one or more of the conventional inserts. For instance, one or more embodiments of the disclosure may provide a ballistic resistant floating through insert which may have one or more of the following benefits: the ability to stop a ballistic projectile; the ability to allow an object to be secured to a panel using a floating nut to provide greater flexibility in aligning the panel with a hole in the object; the ability to provide for increased structural strength; and/or the ability to reduce or eliminate other types of issues of one or more of the conventional inserts.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
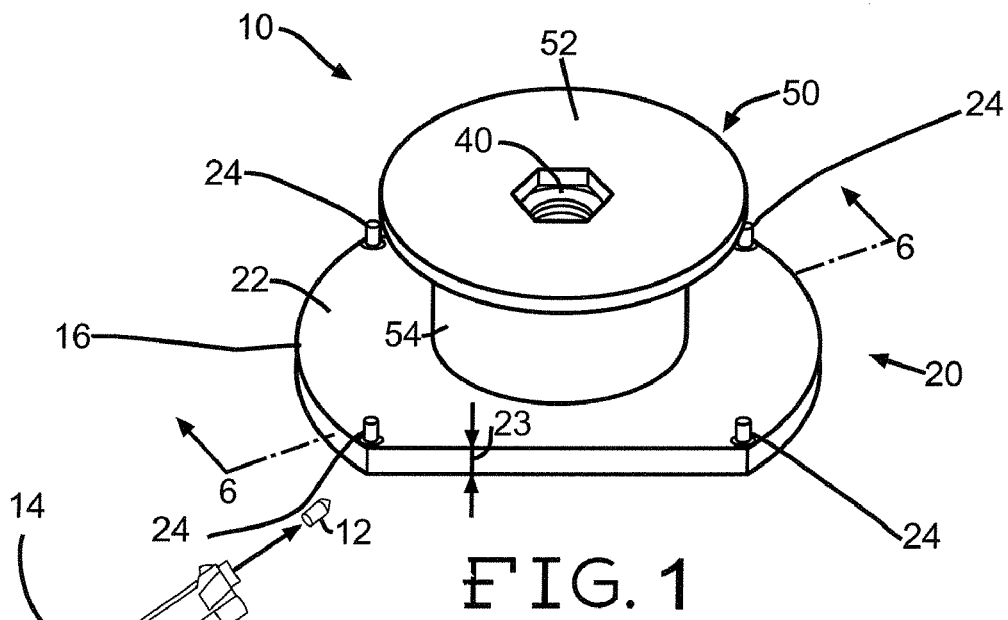
FIG. 1 is an illustration of a perspective view of one embodiment of an insert with a cap connected to a stud.
Figure 6:
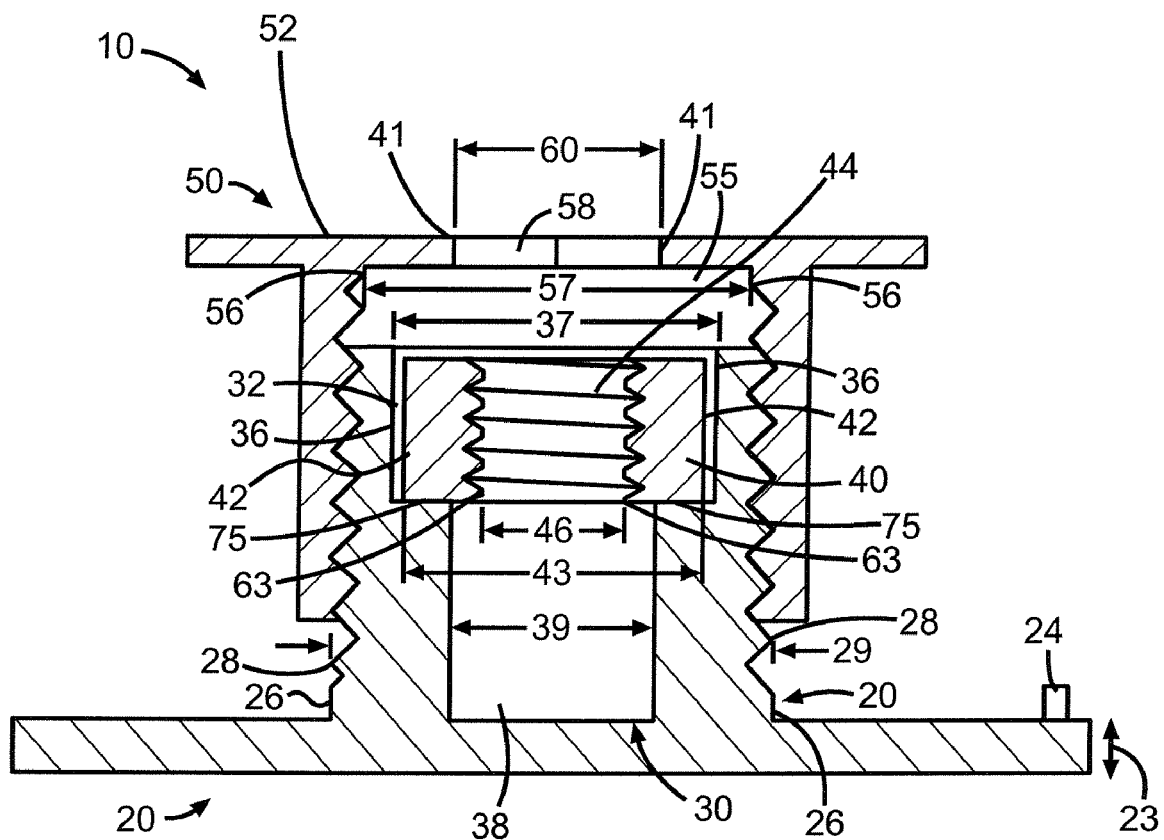
FIG. 6 is an illustration of a cross-sectional view of the insert of FIG. 1 along line 6-6.

FIG. 1 shows a perspective view of a ballistic resistant through insert 10 in an assembled position, with the dashed line 6-6 showing the line along which the cross-sectional view shown in FIG. 6 is taken. The ballistic resistant through insert 10 may be adapted to stop a ballistic projectile 12. For purposes of this disclosure, a ballistic projectile 12 is defined as at least one of a bullet, a ballistic fragment, and a particle fragment. The ballistic resistant through insert 10 may comprise a stud 20, a floating nut 40, and a cap 50. The stud 20 and/or cap 50 may be made of a ballistic resistant material for stopping the ballistic projectile 12, such as a metallic, a plastic, a ceramic, a composite material, Steel (e.g. Stainless Steel), Titanium, or another type of material for stopping a ballistic projectile 12. The stud 20 may comprise a flat base portion 22, on which may be mounted a plurality, such as four, anti-rotation projections 24. An adhesive material such as potting compound may be used in conjunction with or as a substitute for the anti-rotation projections 24. An outer perimeter 16 of the flat base portion 22 may have a polygonal (e.g. hexagonal) shape. In other embodiments, the outer perimeter 16 may vary in shape. The flat base portion 22 may have a minimum thickness 23 for stopping the ballistic projectile 12. The minimum thickness 23 may comprise the minimum thickness required of a ballistic resistant material to stop the ballistic projectile 12. The minimum thickness 23 of the flat base portion 22 of the stud 20 may be at least 0.125 inches. In other embodiments, the minimum thickness 23 may vary depending on the type of material used, and/or the type of ballistic projectile 12 it is designed to stop.

The ballistic resistant through insert 10 may stop a ballistic projectile 12 comprising a 9 mm Full Metal Jacketed Round Nose ballistic projectile having a nominal mass of 8.0 g impacting the ballistic resistant through insert 10 at a minimum velocity of 1400 ft/s. The ballistic resistant through insert may stop a 44 Magnum Semi Jacketed Hollow Point ballistic projectile having a nominal mass of 15.6 g impacting the ballistic resistant through insert 10 at a minimum velocity of 1400 ft/s. The ballistic resistant through insert 10 may stop a ballistic projectile 12 from most handguns 14.

The ballistic resistant through insert 10 may stop a ballistic projectile 12 comprising one or more of the following: a 9 mm Full Metal Jacketed Round Nose ballistic projectile having a nominal mass of 8.0 g impacting the ballistic resistant through insert 10 at a minimum velocity of 1175 ft/s; a 357 Magnum Jacketed Soft Point ballistic projectile having a nominal mass of 10.2 g impacting the ballistic resistant through insert 10 at a minimum velocity of 427 ft/s; a 9 mm Full Metal Jacketed Round Nose ballistic projectile having a nominal mass of 8.0 g impacting the ballistic resistant through insert 10 at a minimum velocity of 1090 ft/s; a 40 S&W caliber Full Metal Jacketed ballistic projectile having a nominal mass of 11.7 g impacting the ballistic resistant through insert 10 at a minimum velocity of 1025 ft/s; a .22 caliber Long Rifle Lead Round Nose ballistic projectile having a nominal mass of 2.6 g impacting the ballistic resistant through insert 10 at a minimum velocity of 1050 ft/s; and a 380 ACP Full Metal Jacketed Round Nose ballistic projectile having a nominal mass of 6.2 g impacting the ballistic resistant through insert 10 at a minimum velocity of 1025 ft/s. In other embodiments, by varying the minimum thickness 23 and/or by varying the material of the ballistic resistant through insert 10, varying types of ballistic projectiles 12 may be stopped at varying velocities.

Figure 2:
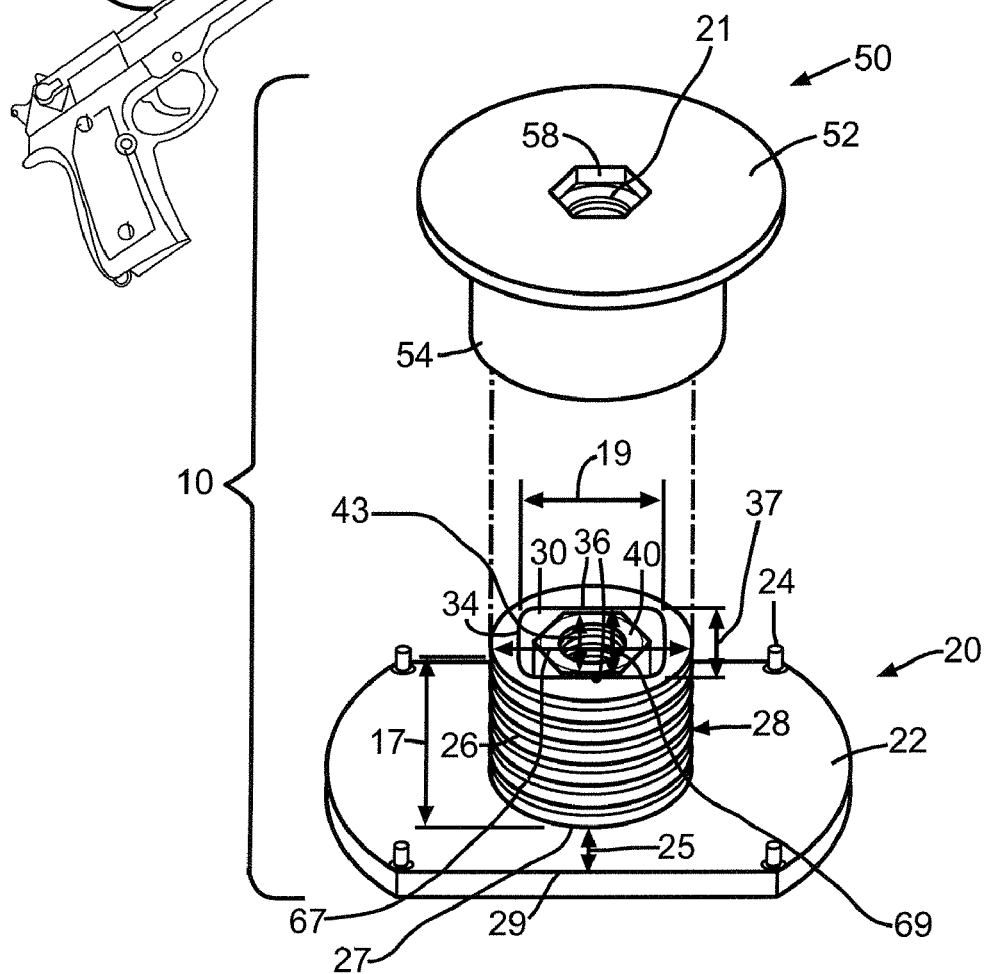
FIG. 2 is an illustration of a perspective view of the insert of FIG. 1 with the cap disconnected from the stud.

The cap 50 may comprise a flat cap portion 52, and a cylindrical cap portion 54. The cylindrical cap portion 54 may be mounted at or near a center of the flat cap portion 52. FIG. 2 shows a perspective view of the ballistic resistant through insert 10, with the cap 50 disconnected from the stud 20. As shown in FIG. 2, the stud 20 may further comprise a cylindrical stud portion 26 mounted on the flat base portion 22. The cylindrical stud portion 26 may comprise a threaded outer surface (male threads) 28 and a stud cylinder aperture 30. The threaded outer surface 28 may extend along the entire length 17 of the cylindrical stud portion 26. A distance 25 between an outer surface 27 of the cylindrical stud portion 26 and an outer surface 29 of the flat base portion 22 may be greater than 0.5 inches. In other embodiments, the distance 25 may be varied in order to provide varying amounts of ballistic protection in order to stop the ballistic projectile 12 at varying distances 25 from the outer surface 27 of the cylindrical stud portion 26. The stud cylinder aperture 30 may comprise an upper aperture perimeter 34 which may comprise at least two aperture perimeter surfaces 36. The two aperture perimeter surfaces 36 may be parallel to each other, and a length 19 of each of the aperture perimeter surfaces 36 may be greater than a distance 37 between them.

The flat cap portion 52 of the cap 50 may comprise a flat cap aperture 58 at or near a center 21 of the flat cap portion 52. The flat cap aperture 58 may be hexagonal to facilitate tightening the cap 50 onto the stud 20 by a wrench, such as without limitation an Allen wrench. In other embodiments, the flat cap aperture 58 may be designed to cooperate with other tightening devices. The flat cap aperture 58 overlays a threaded cylindrical cap aperture 55 (shown in FIG. 3) of the cylindrical cap portion 54.

Figure 3:
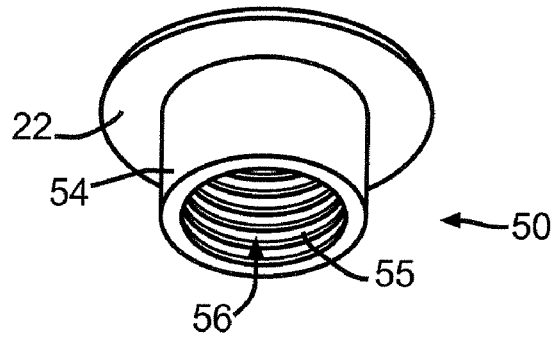
FIG. 3 is an illustration of a perspective view of only the cap of FIG. 1.

FIG. 3 shows a perspective view of the cap 50 alone. As shown in FIG. 3, the cylindrical cap portion 54 may comprise a cylindrical cap aperture 55 and a threaded inner surface 56 comprising female threads. The cylindrical cap aperture 55 may comprise the volume contained by the cylindrical cap portion 54. The cylindrical cap aperture 55 and the threaded inner surface 56 may be configured so that the cylindrical cap portion 54 may mate with the cylindrical stud portion 26 (shown in FIG. 2) when the cap 50 is screwed onto the stud 20 (shown in FIG. 2). The cylindrical cap portion 54 may receive the cylindrical stud portion 26 by interlocking the threaded inner surface 56 onto the threaded outer surface 28 (shown in FIG. 2). In other embodiments, the cylindrical cap portion 54 may have male threads and the cylindrical stud portion 26 may have corresponding female threads.

Figure 4:
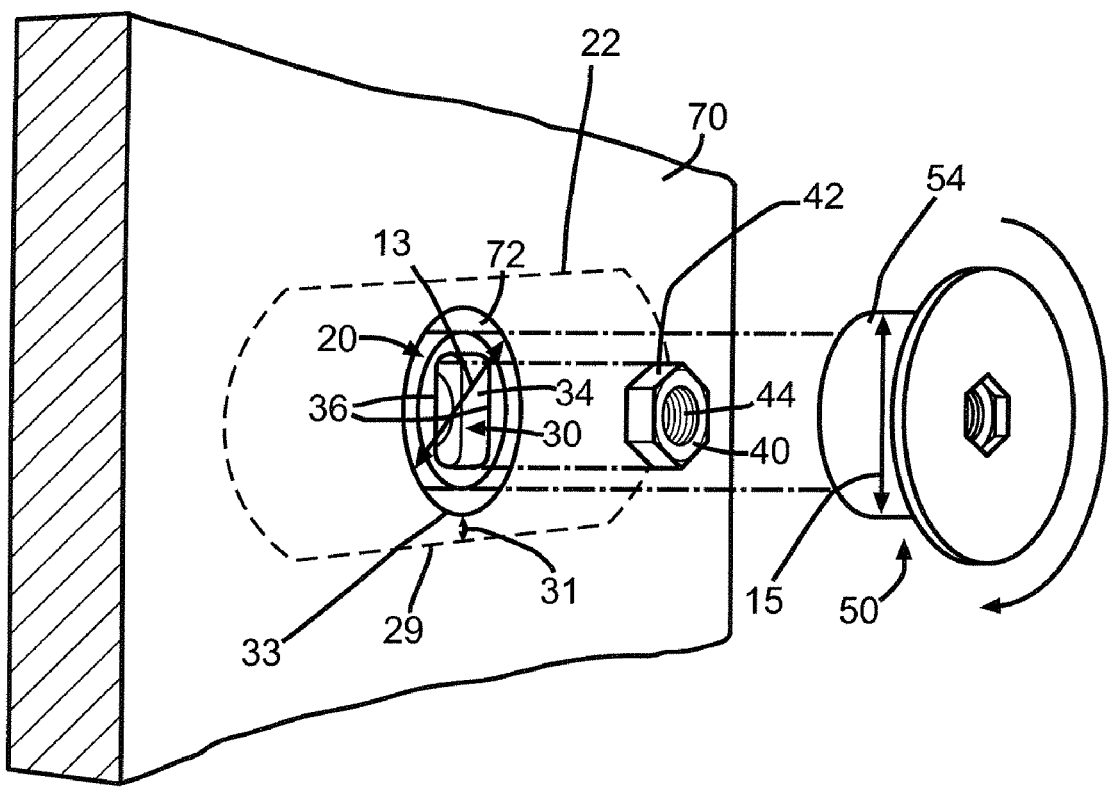
FIG. 4 is an illustration of an exploded view of the insert of FIG. 1 with the stud installed onto a panel, and a locking nut and the cap separated from the stud.

FIG. 4 shows an exploded view of the ballistic resistant through insert 10 and a panel 70 such as a wall or partition, with the stud 20, floating nut 40, and cap 50 separated from each other. The panel 70 may be made of the combination of a composite honeycomb structure, such as that used as a partition for an aircraft cockpit, and a ballistic resistant material. The stud 20 may be inserted into a hole 72 created in the panel 70. The length 17 (shown in FIG. 2) of the cylindrical stud portion 26 may be chosen based on the thickness of the panel 70. The hole 72 may have the same or slightly greater diameter 13 than a diameter 15 of the cylindrical cap portion 54.

The floating nut 40 may comprise a nut outer perimeter 42 and a nut threaded aperture 44 having female threads. In some embodiments, the floating nut 40 may comprise a locking nut. The nut outer perimeter 42 may trace exterior surfaces of the floating nut 40. The nut outer perimeter 42 may be hexagonal. In other embodiments, the nut outer perimeter 42 may comprise a wide variety of shapes having at least two opposite parallel sides.

Figure 5A:
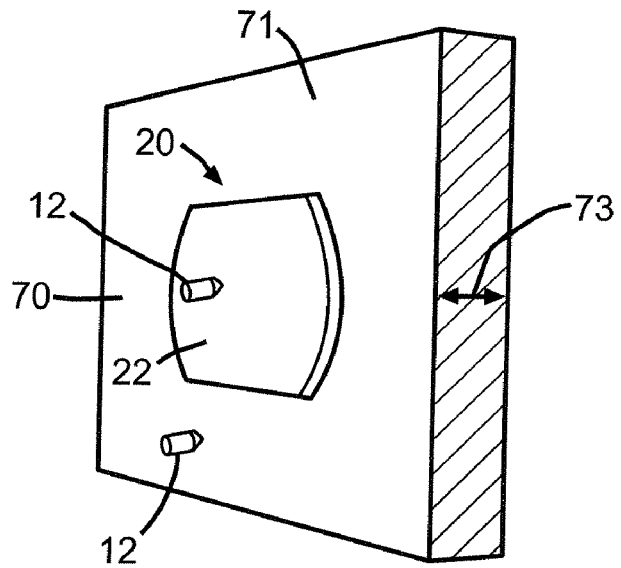
FIG. 5A is an illustration of a perspective view of the insert of FIG. 1 installed onto a panel, the perspective view being from a side of the panel which shows a flat base portion of the stud disposed against the panel.
Figure 5B:
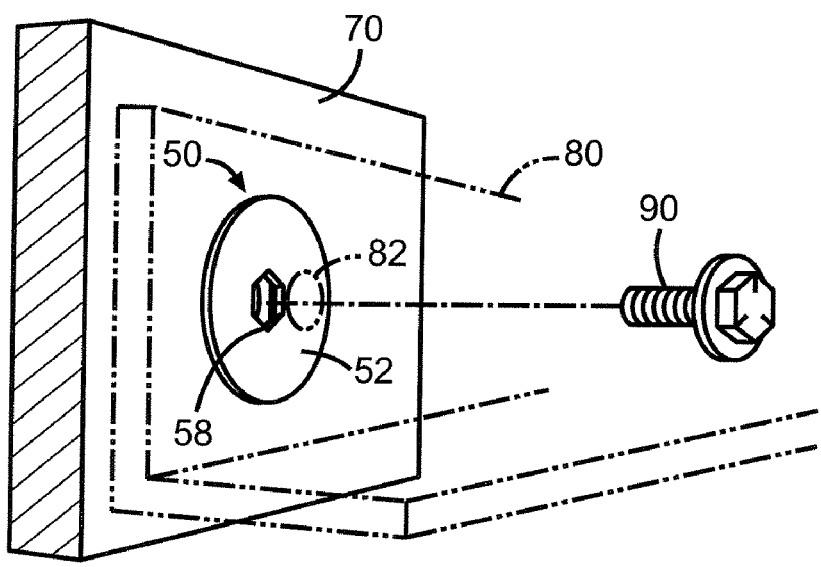
FIG. 5B is an illustration of a perspective view of the insert of FIG. 5A from the other side of the panel showing an object being secured to the insert and to the panel using a fastener.

The nut threaded aperture 44 may comprise a recessed, cylindrical aperture comprising an interior surface of the floating nut 40 configured to receive and hold a fastener 90 (shown in FIG. 5B). The fastener 90 (shown in FIG. 5B) may be a threaded, male, cylindrical device such as a bolt or screw, that is configured to be screwed into the floating nut 40. The size of the floating nut 40 may vary to accommodate different sized fasteners 90. If a larger fastener 90 is used, then the whole ballistic resistant through insert 10 may be increased in overall size to account for the increase in fastener 90 size. In another embodiment, a fastener may be substituted for the floating nut 40 and a corresponding nut may be substituted for the fastener 90.

FIG. 5A shows a perspective view of the ballistic resistant through insert 10 installed onto the panel 70 from a side onto which the stud 20 is installed. As shown in FIG. 5A, the flat base portion 22 of the stud 20 may be substantially flush with the panel 70. The anti-rotation projections 24 (shown in FIG. 1) or adhesive material may grip the panel 70 and prevent the stud 20 from rotating. The panel 70 may have a ballistic resistant surface 71 made of a surface material for stopping the ballistic projectile 12. The ballistic resistant surface 71 may be made of a metallic, a plastic, a ceramic, a composite material, Steel (such as Stainless Steel), Titanium, a Kevlar laminate, S-glass, Spectra, and/or another type of material for stopping a ballistic projectile 12. The panel 70 may have a minimum panel thickness 73 for stopping the ballistic projectile 12. The minimum panel thickness 73 may comprise the minimum thickness of panel 70 required to insert the ballistic resistant through insert 10 and to stop the ballistic projectile 12. The minimum panel thickness 73 may vary depending on the type of ballistic projectile 12 it is designed to stop and/or on the size of the ballistic resistant through insert 10. In one embodiment, the minimum panel thickness 73 may be substantially 1.0 inches. In this embodiment, the panel 70 may stop a ballistic projectile 12 comprising the embodiments of the following two paragraphs. In another embodiment, the minimum panel thickness 73 may be greater than 1.0 inches to stop a larger ballistic projectile 12. In yet another embodiment, the minimum panel thickness 73 may be less than 1.0 inches to stop a smaller ballistic projectile 12.

The ballistic resistant surface 71 may stop a ballistic projectile 12 comprising a 9 mm Full Metal Jacketed Round Nose ballistic projectile having a nominal mass of 8.0 g impacting the ballistic resistant surface 71 at a minimum velocity of 1400 ft/s. The ballistic resistant surface 71 may stop a 44 Magnum Semi Jacketed Hollow Point ballistic projectile having a nominal mass of 15.6 g impacting the ballistic resistant surface 71 at a minimum velocity of 1400 ft/s. The ballistic resistant surface 71 may stop a ballistic projectile 12 from most handguns 14.

The ballistic resistant surface 71 may stop a ballistic projectile 12 comprising one or more of the following: a 9 mm Full Metal Jacketed Round Nose ballistic projectile having a nominal mass of 8.0 g impacting the ballistic resistant surface 71 at a minimum velocity of 1175 ft/s; a 357 Magnum Jacketed Soft Point ballistic projectile having a nominal mass of 10.2 g impacting the ballistic resistant surface 71 at a minimum velocity of 427 ft/s; a 9 mm Full Metal Jacketed Round Nose ballistic projectile having a nominal mass of 8.0 g impacting the ballistic resistant surface 71 at a minimum velocity of 1090 ft/s; a 40 S&W caliber Full Metal Jacketed ballistic projectile having a nominal mass of 11.7 g impacting the ballistic resistant surface 71 at a minimum velocity of 1025 ft/s; a .22 caliber Long Rifle Lead Round Nose ballistic projectile having a nominal mass of 2.6 g impacting the ballistic resistant surface 71 at a minimum velocity of 1050 ft/s; and a 380 ACP Full Metal Jacketed Round Nose ballistic projectile having a nominal mass of 6.2 g impacting the ballistic resistant surface 71 at a minimum velocity of 1025 ft/s. In other embodiments, the minimum panel thickness 73 may vary. By varying the minimum panel thickness 73 and/or by varying the material of the ballistic resistant surface 71, varying types of ballistic projectiles 12 may be stopped at varying velocities.

As shown in FIG. 4, a distance 31 between an outer surface 33 of the hole 72 and an outer surface 29 of the flat base portion 22 may be greater than 0.5 inches in order to prevent the ballistic projectile 12 (shown in FIG. 5A) from traveling around the flat base portion 22 into the hole 72. In other embodiments, the distance 31 may be varied in order to provide varying amounts of ballistic protection in order to stop the ballistic projectile 12 at varying distances 31 from the outer surface 33 of the hole 72.

FIG. 5B shows a perspective view of the ballistic resistant through insert 10 installed onto the panel 70 from a side showing an object 80, such as a piece of furniture or equipment, secured to the panel 70. As shown in FIG. 5B, the flat cap portion 52 of the cap 50 may be substantially flush with the panel 70. The fastener 90 may extend through a hole 82 created in the object 80, through the flat cap aperture 58, through the cylindrical cap aperture 55 (shown in FIG. 3), and through the floating nut 40 (shown in FIG. 2) located inside the stud cylinder aperture 30 so that the fastener 90 may interlock with the nut threaded aperture 44 (shown in FIG. 3) of the floating nut 40. In other embodiments, the object 80 may be mounted to the panel 70 using any number of fasteners 90 acting in cooperation with a corresponding number of ballistic resistant through inserts 10 disposed within a corresponding numbers of holes 72 (shown in FIGS. 4) and 82 (shown in FIG. 5B) in the panel 70 and object 80. Each ballistic resistant through insert 10 may comprise any of the embodiments disclosed herein.

FIG. 6 shows a cross-sectional view of the ballistic resistant through insert 10 cut along the dashed line 6-6 shown in FIG. 1. The flat cap aperture 58 of the cap 50 may comprise a cap aperture diameter 60, measured as a distance between opposite sides 41 of the flat cap aperture 58. The cylindrical cap aperture 55 may comprise a cylindrical cap aperture diameter 57. The cylindrical cap aperture diameter 57 may comprise an inner diameter of the threaded inner surface 56, comprising the distance between opposing threads 56 of the cylindrical cap aperture 55.

A nut exterior diameter 43 of the floating nut 40 may comprise a distance between opposing sides of the nut outer perimeter 42. A nut threaded aperture diameter 46 may comprise an inner diameter across the nut threaded aperture 44, comprising the distance between opposing threads 63 of the nut threaded aperture 44.

The stud cylinder aperture 30 may comprise an upper aperture portion 32 and a lower aperture portion 38. An upper aperture diameter 37 may comprise the distance across the upper aperture portion 32 from one aperture perimeter surface 36 to another 36. A lower aperture diameter 39 may comprise a diameter of the lower aperture portion 38. A threaded outer surface diameter 29 of the cylindrical stud portion 26 may comprise an outer diameter of the threaded outer surface 28, comprising the distance between opposing threads of the threaded outer surface 28.

The upper aperture diameter 37 of the stud cylinder aperture 30 may be the same as or slightly greater than the nut exterior diameter 43, allowing the floating nut 40 to fit into the upper aperture portion 32. The upper aperture diameter 37 may be greater than the lower aperture diameter 39. The lower aperture diameter 39 may be less than the nut exterior diameter 43, allowing the floating nut 40 to rest above the lower aperture portion 38. The threaded outer surface diameter 29 may be the same as or slightly greater than the threaded cylindrical cap aperture diameter 57. The cap aperture diameter 60 may be greater than the nut threaded aperture diameter 46.

The floating nut 40 may be placed into the upper aperture portion 32, resting above the lower aperture portion 38, due to the upper aperture diameter 37 being greater than the lower aperture diameter 39, and the lower aperture diameter 39 being less than the nut exterior diameter 43. The floating nut 40 may be prevented from rotating because the distance 37 between the parallel aperture surfaces 36 may be the same as or slightly greater than the nut exterior diameter 43. As shown in FIG. 2, the floating nut 40 may float inside the stud cylinder aperture 30 by sliding back and forth in a direction 67 parallel to the aperture perimeter surfaces 36 as a result of the length 19 of the aperture perimeter surfaces 36 being greater than the nut exterior diameter 43.

As shown in FIG. 6, the cap 50 may be screwed onto the stud 20 due to the threaded outer surface diameter 29 being the same as or slightly greater than the threaded cylindrical cap aperture diameter 57, allowing the threads and grooves of the threaded outer surface 28 and threaded inner surface 56 to interlock with each other. The fastener 90 (shown in FIG. 5B) may enter the ballistic resistant through insert 10 through the flat cap aperture 58 at an angle which is not perpendicular to the flat cap portion 52 due to the cap aperture diameter 60 being greater than the nut threaded aperture diameter 46.

Figure 7:
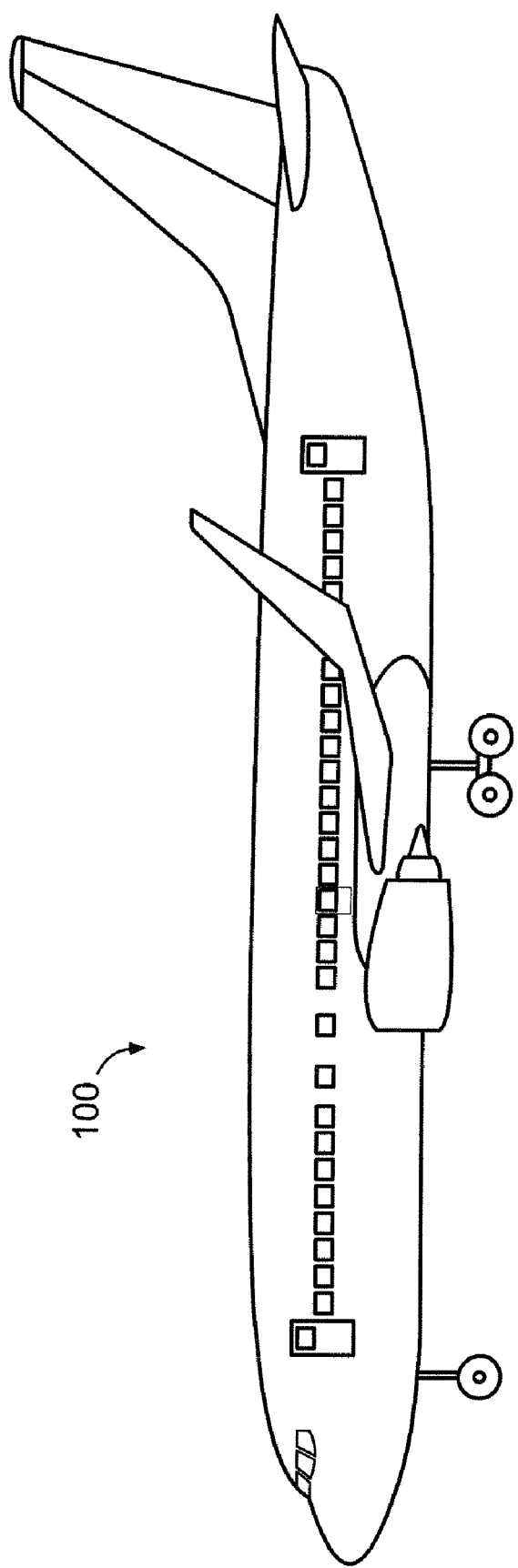
FIG. 7 is an illustration of a perspective view of a vehicle which may utilize the insert of FIG. 1.
Figure 11:
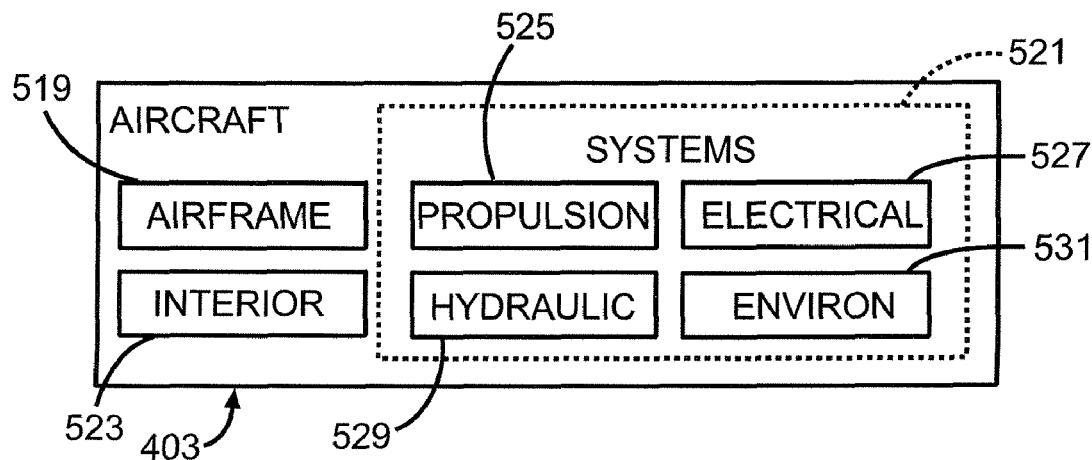
FIG. 11 is a block diagram of an aircraft.

The ballistic resistant through insert 10 may be used to install an object 80 (shown in FIG. 5B), such as a piece of furniture or equipment, onto the panel 70 using the fastener 90. One application for the ballistic resistant through insert 10 is to secure objects 80 onto the panel 70 of a vehicle 100 (as shown in FIGS. 7 and 11). The vehicle 100 may comprise an aircraft. The ballistic resistant through inset 10 may be used, as shown in FIG. 11, on an interior 523 of an aircraft 500. In other embodiments, the ballistic resistant through insert 10 may be used on varying types of vehicles 100 or on other types of structures.

In operation, as shown in FIG. 4, the hole 72 may be created in the panel 70, and the cylindrical stud portion 26 (shown in FIG. 2) of the stud 20 may be placed into the hole 72 in the panel 70. As shown in FIG. 5A, the flat base portion 22 of the stud 20 (shown in FIG. 2) may be aligned substantially flush with the panel 70, and the anti-rotation projections 24 (shown in FIG. 1) or adhesive material may grip the panel 70 to prevent the stud 20 (shown in FIG. 2) from rotating or sliding.

As shown in FIG. 6, the floating nut 40 may be placed into the upper aperture portion 32, and may rest on the portion 75 of the cylindrical stud portion 26 that surrounds the lower aperture portion 38. As shown in FIG. 2, the hexagonal shape of the floating nut 40 and the two aperture perimeter surfaces 36 may allow the floating nut 40 to slide and rock back and forth in a direction 67 parallel to the aperture perimeter surfaces 36. This may be because the length 19 of the aperture perimeter surfaces 36 is greater than the nut exterior diameter 43. However, the floating nut 40 may not substantially rotate, slide, or rock in substantially perpendicular direction 69 relative to the aperture perimeter surfaces 36 due to the nut outer perimeter 42 abutting against the opposing aperture perimeter surfaces 36. In other embodiments, the shapes of floating nut 40 and aperture perimeter surface 36 may vary.

As shown in FIG. 6, the cap 50 may be screwed onto the stud 20 by interlocking the threaded inner surface 56 with the threaded outer surface 28 until the flat cap portion 52 is substantially flush and/or parallel to the panel 70 (shown in FIG. 5B). The cap 50 may be locked onto the stud 20. As shown in FIG. 5B, the fastener 90 may be driven through a hole 82 in the object 80, through the flat cap aperture 58, and screwed into the floating nut 40 (shown in FIG. 6). If the fastener 90 was driven through the hole 82 in the object 80 at a location that was not precisely aligned with the nut threaded aperture 44 (shown in FIG. 6), then the floating nut 40 (shown in FIG. 6) may be moved or rocked along the direction 67 (shown in FIG. 2) parallel to the aperture perimeter surfaces 36 to align the nut threaded aperture 44 (shown in FIG. 6) with the fastener 90. This movement of the floating nut 40 may provide the ballistic resistant through insert 10 with floating capability to receive screws or bolts that are not precisely aligned with the ballistic resistant through insert 10. If necessary, the stud 20 (shown in FIG. 2) may be rotated so that the direction 67 (shown in FIG. 2) parallel to the aperture perimeter surfaces 36 allows the nut threaded aperture 44 (shown in FIG. 6) to be aligned with the fastener 90. The fastener 90 may be driven through the floating nut 40, using an Allen wrench or other tool, to secure the object 80 to the panel 70. It should be noted that the floating feature is only in direction 67 so the ballistic resistant through insert 10 may require installation of the stud 20 into the hole 72 in the panel 70 (see FIG. 5B) in an orientation which takes advantage of direction 67 for proper alignment. In such manner, the floating nut 40 may allow alignment of the fastener 90 with the floating nut 40.

In embodiments in which the floating nut 40 comprises a locking nut, the fastener 90 may be secured to the ballistic resistant through insert 10 such that the fastener 90 and the object 80 are locked in place. Using a locking nut for the floating nut 40 may reduce the likelihood that vibrations will cause the fastener 90 to twist and loosen.

As shown in FIG. 6, locking the stud 20 and the cap 50 together by interconnecting the threaded outer surface 28 with the threaded inner surface 56 may improve retention of the ballistic resistant through insert 10 inside the panel 70 (shown in FIG. 5B). The ability to lock the stud 20 and the cap 50 together may also obviate the need for potting compound or glue to secure an insert into the panel 70. As shown in FIG. 5A, the flat base portion 22 of the stud 20 may improve pullout strength by pressing against the panel 70.

As shown in FIG. 5B, the floating feature of the floating nut 40 may allow for tolerance of mismatches between the ballistic resistant through insert 10 and the object 80. This tolerance may advantageously decrease the installation time of objects 80 onto panels 70 by obviating the need to reconfigure a hole 72 (shown in FIG. 4) in a panel 70 that was created in an incorrect location.

Figure 8:
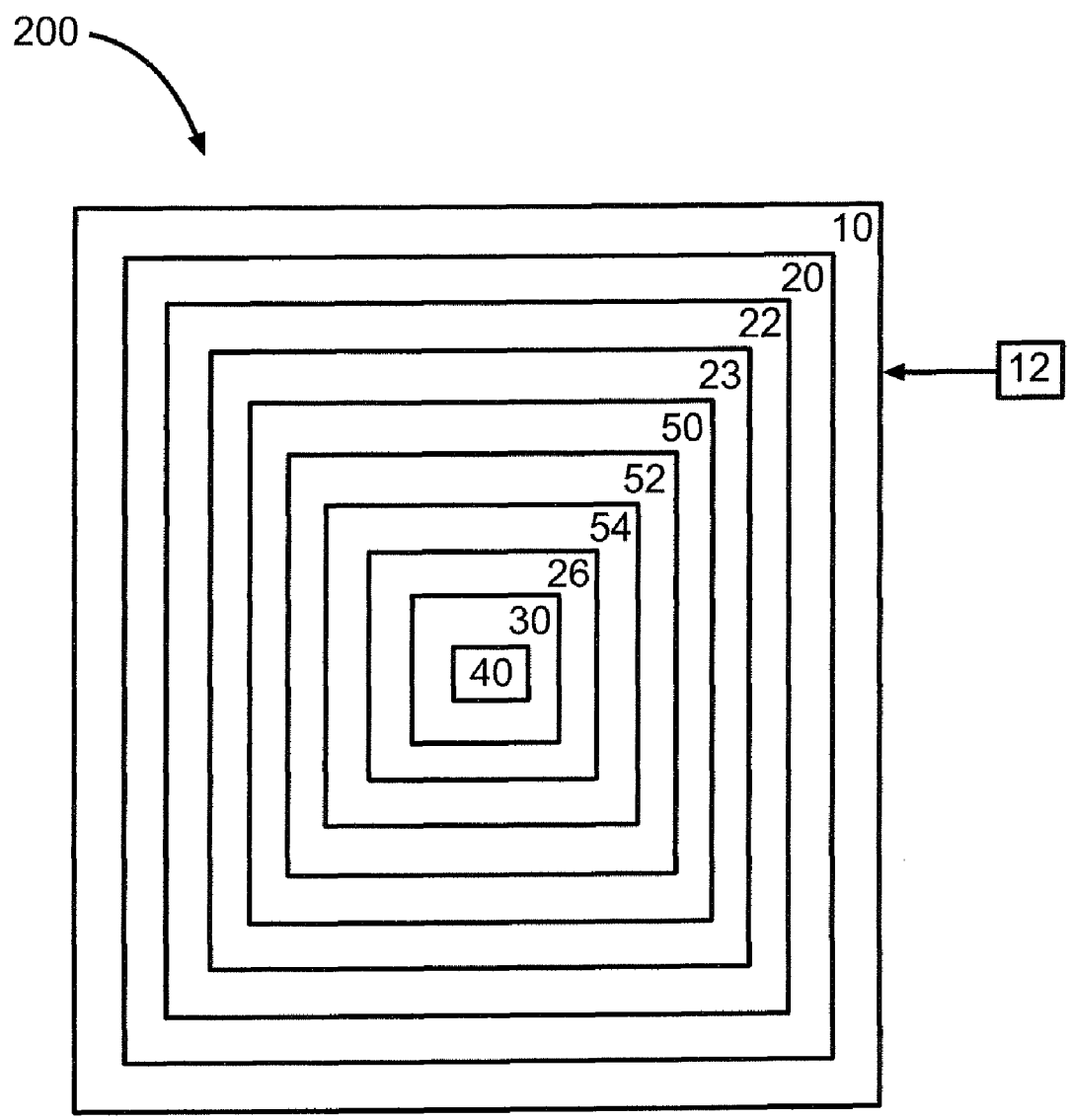
FIG. 8 is an illustration of a functional box diagram showing one embodiment of a ballistic resistant through insert.

FIG. 8 is an illustration of a functional box diagram 200 showing one embodiment of a ballistic resistant through insert 10. As shown in FIG. 8, the ballistic resistant through insert 10 may comprise a stud 20, a flat base portion 22 having a minimum thickness 23 for stopping a ballistic projectile 12, a floating cap 50, a flat cap portion 52, a cylindrical cap portion 54, a cylindrical stud portion 26, a stud cylindrical aperture 30, and a floating nut 40. In other embodiments, the ballistic resistant through insert 10 may vary.

Figure 9:
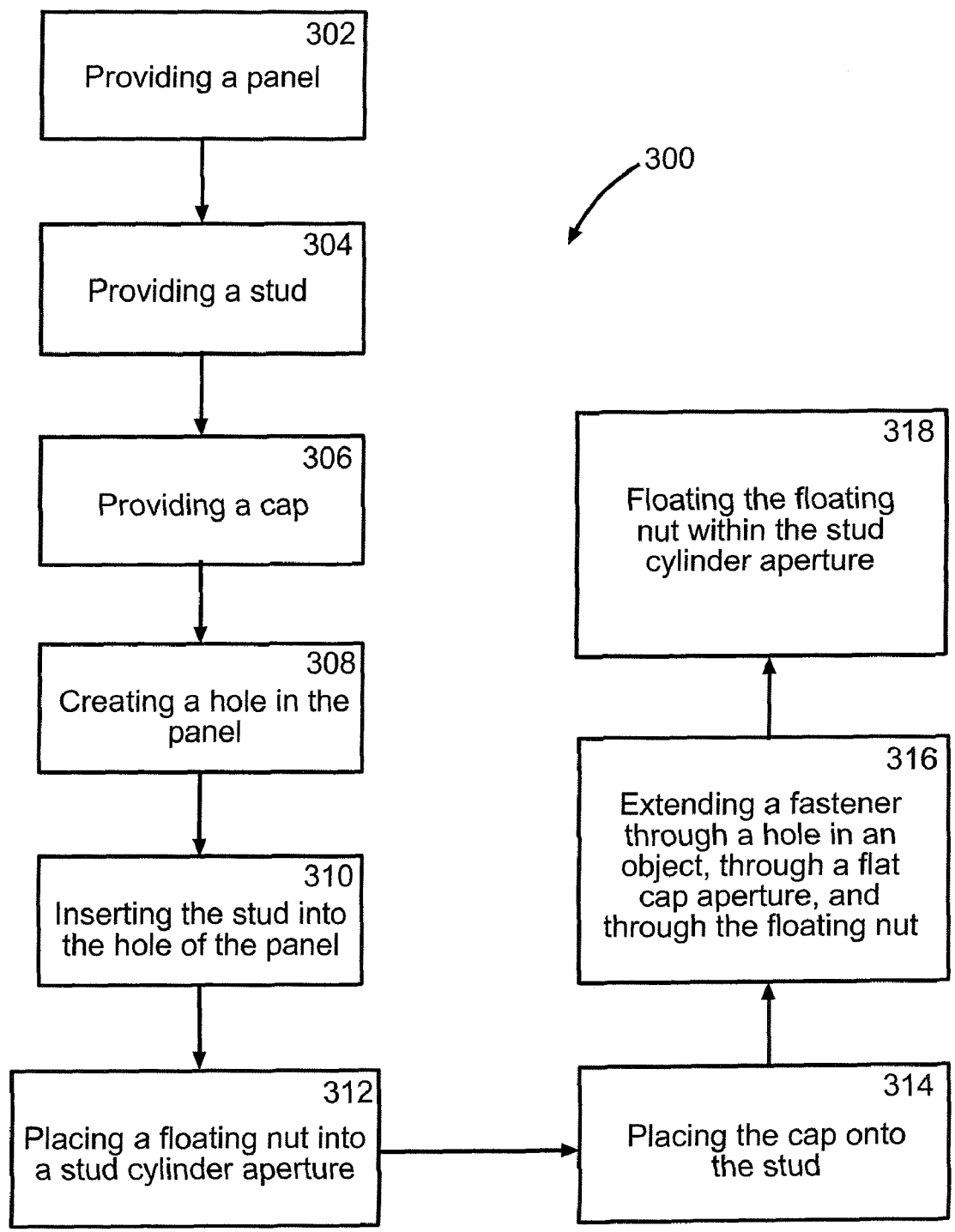
FIG. 9 is an illustration of a flowchart showing one embodiment of a method for securing an object to a panel to provide ballistic resistance from a ballistic projectile.

FIG. 9 is an illustration of a flowchart showing one embodiment of a method 300 for securing an object 80 to a panel 70 to provide ballistic resistance from a ballistic projectile 12 defined as at least one of a bullet, a ballistic fragment, and a particle fragment. In step 302, a panel 70 may be provided. The panel 70 may comprise a portion of a vehicle 100 such as an aircraft. The panel 70 may be used on an interior 523 of an aircraft 500. In other embodiments, the panel 70 may vary. The panel 70 may be made of the combination of a composite honeycomb structure, such as that used as a partition for an aircraft cockpit, and a ballistic resistant material. The panel 70 may comprise a ballistic resistant surface 71 comprising a surface material for stopping a ballistic projectile 12. The ballistic resistant surface 71 may be made of a material comprising a metallic, a plastic, a ceramic, a composite material, Steel, Titanium, a Kevlar laminate, S-glass, Spectra, and/or another type of material. The panel 70 may have a minimum panel thickness 73 for stopping a ballistic projectile 12. The minimum panel thickness 73 may vary depending on the type of ballistic projectile 12 it is designed to stop and/or on the size of the ballistic resistant through insert 10. In one embodiment, the minimum panel thickness 73 may be substantially 1.0 inches. In another embodiment, the minimum panel thickness 73 may be greater than 1.0 inches to stop a larger ballistic projectile 12. In yet another embodiment, the minimum panel thickness 73 may be less than 1.0 inches to stop a smaller ballistic projectile 12.

In step 304, a stud 20 may be provided. The stud 20 may comprise a flat base portion 22 and a cylindrical stud portion 26 mounted thereon. The stud 20 may be made of a material for stopping a ballistic projectile 12. The stud 20 may be made of a material for stopping the ballistic projectile 12 such as a metallic, a plastic, a ceramic, a composite material, Steel, Titanium, or another type of material for stopping the ballistic projectile 12. The flat base portion 22 may have a minimum thickness 23 for stopping a ballistic projectile 12. The minimum thickness 23 of the flat base portion 22 of the stud 20 may be at least 0.125 inches. In other embodiments, the minimum thickness 23 of the stud 20 may vary. The cylindrical stud portion 26 may have a stud cylinder aperture 30. A distance 25 between an outer surface 27 of the cylindrical stud portion 26 and an outer surface 29 of the flat base portion 22 may be greater than 0.5 inches. In other embodiments, the distance 25 may be varied in order to provide varying amounts of ballistic protection in order to stop the ballistic projectile 12 at varying distances 25 from the outer surface 27 of the cylindrical stud portion 26.

In step 306, a cap 50 may be provided. The cap 50 may be made of a material for stopping the ballistic projectile 12 such as a metallic, a plastic, a ceramic, a composite material, Steel, Titanium, or another type of material for stopping the ballistic projectile 12. The cap 50 may comprise a flat cap portion 52 and a cylindrical cap portion 54 mounted thereon. The flat cap portion 52 may have a flat cap aperture 58.

In step 308, a hole 72 may be created in the panel 70. In step 310, the stud 20 may be inserted into the hole 72 in the panel 70. Step 310 may comprise orienting the stud 20 into the hole 72 in the panel 70 so that the floating nut 40 will allow alignment of the fastener 90 with the floating nut 40. The distance 31 between an outer surface 33 of the hole 72 in the panel 70 and an outer surface 29 of the flat base portion 22 may be greater than 0.5 inches in order to prevent the ballistic projectile 12 from traveling around the flat base portion 22 into the hole 33. In other embodiments, the distance 31 may be varied in order to provide varying amounts of ballistic protection in order to stop the ballistic projectile 12 at varying distances 31 from the outer surface 33 of the hole 72.

In step 312, a floating nut 40 may be placed into the stud cylinder aperture 30. In step 314, the cap 50 may be placed onto the stud 20. In step 316, a fastener 90 may be extended through a hole 82 in an object 80, through the flat cap aperture 58, and through the floating nut 40. In step 318, the floating nut 40 may be floated within the stud cylinder aperture 30.

The ballistic resistance provided by following the method 300 may allow for a ballistic projectile 12 to be stopped by at least one of the stud 20 and the panel 70. The ballistic projectile 12 which may be stopped may comprise one of the following ballistic projectiles: a 9 mm Full Metal Jacketed Round Nose ballistic projectile having a nominal mass of 8.0 g and a minimum velocity of 1400 ft/s; a 44 Magnum Semi Jacketed Hollow Point ballistic projectile having a nominal mass of 15.6 g and a minimum velocity of 1400 ft/s; a 9 mm Full Metal Jacketed Round Nose ballistic projectile having a nominal mass of 8.0 g and a minimum velocity of 1175 ft/s; a 357 Magnum Jacketed Soft Point ballistic projectile having a nominal mass of 10.2 g and a minimum velocity of 427 ft/s; a 9 mm Full Metal Jacketed Round Nose ballistic projectile having a nominal mass of 8.0 g and a minimum velocity of 1090 ft/s; a 40 S&W caliber Full Metal Jacketed ballistic projectile having a nominal mass of 11.7 g and a minimum velocity of 1025 ft/s; a .22 caliber Long Rifle Lead Round Nose ballistic projectile having a nominal mass of 2.6 g and a minimum velocity of 1050 ft/s; a 380 ACP Full Metal Jacketed Round Nose ballistic projectile having a nominal mass of 6.2 g and a minimum velocity of 1025 ft/s; and/or another type of ballistic projectile 12 having a varying velocity.

Figure 10:
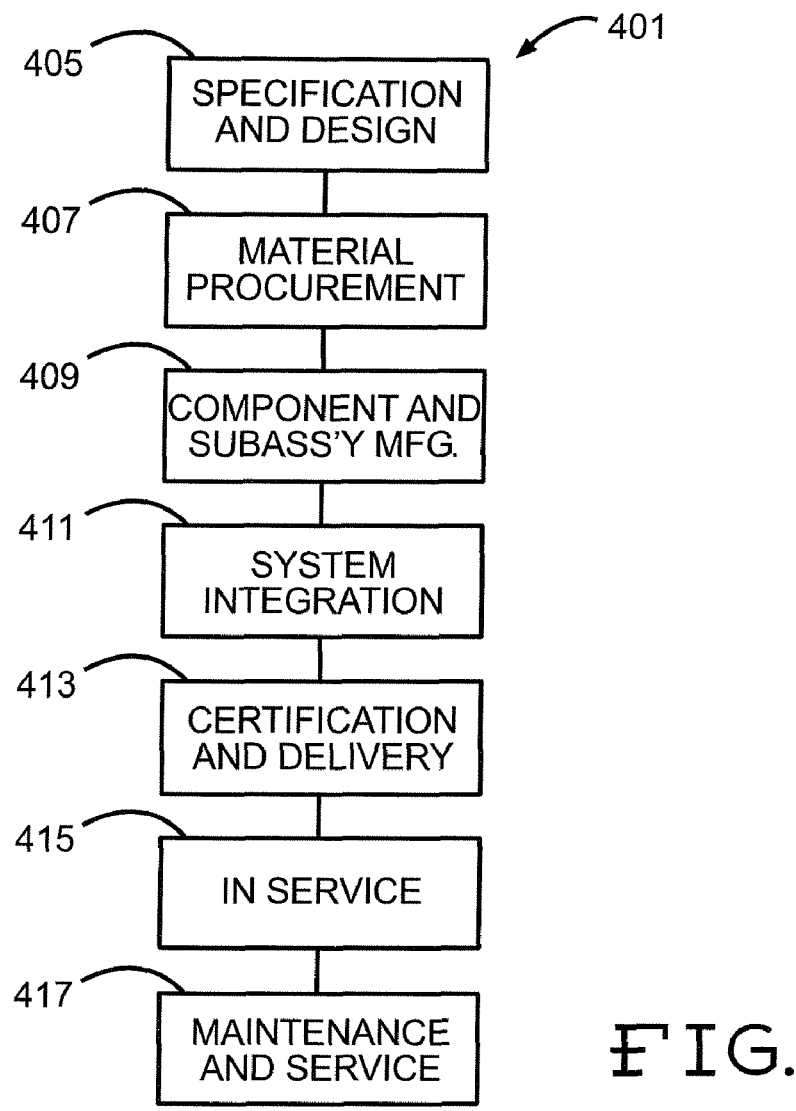
FIG. 10 is a flow diagram of aircraft production and service methodology.

Referring more particularly to the drawings, embodiments of the disclosure may be described in the context of an aircraft manufacturing and service method 401 as shown in FIG. 10 and an aircraft 403 as shown in FIG. 11. During pre-production, exemplary method 401 may include specification and design 405 of the aircraft 403 and material procurement 407. During production, component and subassembly manufacturing 409 and system integration 411 of the aircraft 403 takes place. Thereafter, the aircraft 403 may go through certification and delivery 413 in order to be placed in service 415. While in service by a customer, the aircraft is scheduled for routine maintenance and service 417 (which may also include modification, reconfigurations, refurbishment, and so on).

Each of the processes of method 401 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 403 produced by exemplary method 401 may include an airframe 519 with a plurality of systems 521 and an interior 523. The aircraft 403 may utilize the ballistic resistant through insert 10 and/or panel 70 of FIGS. 1-8 in order to provide ballistic resistance to stop a ballistic projectile 12 as disclosed herein. Examples of high-level systems 521 include one or more of a propulsion system 525, an electrical system 527, a hydraulic system 529, and an environmental system 531. Any number of other systems may be included. Although an aerospace example is shown, the principles of the invention may be applied to other industries, such as the automotive industry.

Apparatus and methods embodied herein may be employed during any one or more of the stages of the production and service method 401. For example, components or subassemblies corresponding to production process 409 may be fabricated or manufactured in a manner similar to components or subassemblies produced while the aircraft 403 is in service. Also, one or more apparatus embodiments, method embodiments, or a combination thereof may be utilized during the production stages 409 and 411, for example, by substantially expediting assembly of or reducing the cost of an aircraft 403. Similarly, one or more of apparatus embodiments, method embodiments, or a combination thereof may be utilized while the aircraft 403 is in service, for example and without limitation, to maintenance and service 417.

One or more embodiments of the disclosure may reduce one or more issues of one or more of the conventional inserts. For instance, one or more embodiments of the disclosure may provide a ballistic resistant floating through insert which may have one or more of the following benefits: the ability to stop a ballistic projectile; the ability to allow an object to be secured to a panel using a floating nut to provide greater flexibility in aligning the panel with a hole in the object; the ability to provide for increased structural strength; and/or the ability to reduce or eliminate other types of issues of one or more of the conventional inserts.

It should be understood, of course, that the foregoing relates to exemplary embodiments of the disclosure and that modifications may be made without departing from the spirit and scope of the disclosure as set forth in the following claims.

I claim:

1. A through insert with floating capability comprising:
   a stud having a base portion and a threaded cylindrical stud portion mounted thereon, the threaded cylindrical stud portion comprising a stud cylinder aperture comprising an upper aperture portion and a lower aperture portion, the upper aperture portion comprising two sets of opposed surfaces with the first set of opposed surfaces located closer to one another than the second set of opposed surfaces;
   a floating nut located inside the stud cylinder aperture with the floating nut sitting on top of the lower aperture portion completely disposed within the upper aperture portion, such that the floating nut floats within the stud cylinder aperture, the first set of opposed surfaces preventing the floating nut from rotating within the upper aperture portion and the second set of opposed surfaces allowing the floating nut to slide back and forth in the upper aperture portion; and
   a cap having a top cap portion and a threaded cylindrical cap portion mounted thereon, wherein the threaded cylindrical cap portion is threadedly mated with the threaded cylindrical stud portion.

2. The through insert of claim 1 wherein the threaded cylindrical stud portion comprises a threaded outer surface, the threaded cylindrical cap portion comprises a threaded inner surface, and the threaded cylindrical cap portion receives the threaded cylindrical stud portion by interlocking the threaded inner surface onto the threaded outer surface.

3. The through insert of claim 1, wherein the top cap portion comprises a cap aperture, and a fastener extends through the cap aperture into threaded engagement with the floating nut.

4. The through insert of claim 1, wherein a distance between an outer surface of the threaded cylindrical stud portion and an outer surface of the base portion is greater than 0.5 inches.

5. The through insert of claim 1, wherein the through insert comprises a portion of at least one of a vehicle or an aircraft.

6. The through insert of claim 1 wherein the base portion of the stud comprises anti-rotation pin members extending from the base portion.

7. The through insert of claim 1 wherein the stud is ballistic resistant for stopping a ballistic projectile comprising a bullet or a ballistic fragment.

8. The through insert of claim 7 wherein the base portion of the stud has a minimum thickness of at least 0.125 inches for stopping the ballistic projectile.

9. The through insert of claim 7 wherein the ballistic resistant stud will stop the ballistic projectile comprising at least one of a 9 mm Full Metal Jacketed Round Nose ballistic projectile having a nominal mass of 8.0 g and a minimum velocity of 1090 ft/s, a 44 Magnum Semi Jacketed Hollow Point ballistic projectile having a nominal mass of 15.6 g and a minimum velocity of 1400 ft/s, a 357 Magnum Jacketed Soft Point ballistic projectile having a nominal mass of 10.2 g and a minimum velocity of 427 ft/s, a 40 S&W caliber Full Metal Jacketed ballistic projectile having a nominal mass of 11.7 g and a minimum velocity of 1025 ft/s, a .22 caliber Long Rifle Lead Round Nose ballistic projectile having a nominal mass of 2.6 g and a minimum velocity of 1050 ft/s, or a 380 ACP Full Metal Jacketed Round Nose ballistic projectile having a nominal mass of 6.2 g and a minimum velocity of 1025 ft/s.

10. The through insert of claim 7 wherein the ballistic resistant stud is made of Steel, Titanium, or a composite.

11. The through insert of claim 9 wherein the cap is also ballistic resistant and is made of Steel, Titanium, or a composite for stopping the ballistic projectile.

12. An assembly comprising:
   a panel;
   an object; and
   a through insert comprising: a stud having a base portion and a threaded cylindrical stud portion mounted thereon, the threaded cylindrical stud portion comprising a stud cylinder aperture comprising an upper aperture portion and a lower aperture portion, the upper aperture portion comprising two sets of opposed surfaces with the first set of opposed surfaces located closer to one another than the second set of opposed surfaces; a floating nut located inside the stud cylinder aperture with the floating nut sitting on top of the lower aperture portion completely disposed within the upper aperture portion such that the floating nuts floats within the stud cylinder aperture, the first set of opposed surfaces preventing the floating nut from rotating within the upper aperture portion and the second set of opposed surfaces allowing the floating nut to slide back and forth in the upper aperture portion; and a cap having a top cap portion and a threaded cylindrical cap portion mounted thereon;

wherein the base portion and the top cap portion are disposed on opposite sides of the panel with the threaded cylindrical cap portion threadedly attached to the threaded cylindrical stud portion thereby attaching the through insert to the panel, and a fastener is disposed through a hole in the object, into the stud cylinder aperture, and threaded into the floating nut disposed within the stud cylinder aperture thereby attaching the object to the panel.

13. The assembly of claim 12 wherein the assembly comprises a portion of a vehicle or an aircraft.

14. The assembly of claim 12 wherein anti-rotation pin members extend from the base portion of the stud into the panel.

15. The assembly of claim 12 wherein the stud and the panel are ballistic resistant for stopping a ballistic projectile comprising at least one of a bullet or a ballistic fragment.

16. A method for securing an object to a panel comprising:
providing a panel, an object, and a through insert, the through insert comprising: a stud having a base portion and a threaded cylindrical stud portion mounted thereon, the threaded cylindrical stud portion comprising a stud cylinder aperture comprising an upper aperture portion and a lower aperture portion, the upper aperture portion comprising two sets of opposed surfaces with the first set of opposed surfaces located closer to one another than the second set of opposed surfaces; and a cap having a top cap portion and a threaded cylindrical cap portion mounted thereon;
inserting the threaded cylindrical stud portion through a hole in the panel so that the base portion is abutted against a first side of the panel which is opposed to a second side of the panel;
placing a floating nut into the stud cylinder aperture with the floating nut sitting on top of the lower aperture portion completely disposed within the upper aperture portion so that the floating nut floats in the stud cylinder aperture, the first set of opposed surfaces preventing the floating nut from rotating within the upper aperture portion and the second set of opposed surfaces allowing the floating nut to slide back and forth in the upper aperture portion;
disposing the cap on the second side of the panel and threadely attaching the threaded cylindrical cap portion to the threaded cylindrical stud portion in the hole of the panel thereby locking the through insert to the panel with the base portion and the top cap portion disposed on opposite sides of the first and second sides of the panel; and
extending a fastener through a hole in the object, into the stud cylinder aperture, and threadedly attaching the fastener to the floating nut disposed within the stud cylinder aperture between the first and second sides of the panel thereby attaching the object to the panel.

17. The method of claim 16 wherein the panel and the object comprise portions of a vehicle or an aircraft.

18. The method of claim 16 further comprising extending anti-rotation pin members of the base portion of the stud into the panel.

19. The method of claim 16 wherein the stud and the panel are ballistic resistant for stopping a ballistic projectile comprising at least one of a bullet or a ballistic fragment.

20. The assembly of claim 15 wherein the ballistic resistant stud and the ballistic resistant panel will stop the ballistic projectile comprising at least one of a 9 mm Full Metal Jacketed Round Nose ballistic projectile having a nominal mass of 8.0 g and a minimum velocity of 1090 ft/s, a 44 Magnum Semi Jacketed Hollow Point ballistic projectile having a nominal mass of 15.6 g and a minimum velocity of 1400 ft/s, a 357 Magnum Jacketed Soft Point ballistic projectile having a nominal mass of 10.2 g and a minimum velocity of 427 ft/s, a 40 S&W caliber Full Metal Jacketed ballistic projectile having a nominal mass of 11.7 g and a minimum velocity of 1025 ft/s, a .22caliber Long Rifle Lead Round Nose ballistic projectile having a nominal mass of 2.6 g and a minimum velocity of 1050 ft/s, or a 380 ACP Full Metal Jacketed Round Nose ballistic projectile having a nominal mass of 6.2 g and a minimum velocity of 1025 ft/s.

21. The method of claim 19 wherein the ballistic resistant stud and the ballistic resistant panel will stop the ballistic projectile comprising at least one of a 9 mm Full Metal Jacketed Round Nose ballistic projectile having a nominal mass of 8.0 g and a minimum velocity of 1090 ft/s, a 44 Magnum Semi Jacketed Hollow Point ballistic projectile having a nominal mass of 15.6 g and a minimum velocity of 1400 ft/s, a 357 Magnum Jacketed Soft Point ballistic projectile having a nominal mass of 10.2 g and a minimum velocity of 427 Ws, a 40 S&W caliber Full Metal Jacketed ballistic projectile having a nominal mass of 11.7 g and a minimum velocity of 1025 Ws, a .22 caliber Long Rifle Lead Round Nose ballistic projectile having a nominal mass of 2.6 g and a minimum velocity of 1050 ft/s, or a 380 ACP Full Metal Jacketed Round Nose ballistic projectile having a nominal mass of 6.2 g and a minimum velocity of 1025 ft/s.

22. An assembly comprising:
a panel;
an object; and
a through insert comprising: a stud having a base portion and a threaded cylindrical stud portion mounted thereon, the threaded cylindrical stud portion comprising a stud cylinder aperture; a floating nut located inside the stud cylinder aperture such that the floating nuts floats within the stud cylinder aperture; and a cap having a top cap portion and a threaded cylindrical cap portion mounted thereon;
wherein the base portion and the top cap portion are disposed on opposite sides of the panel with the threaded cylindrical cap portion threadedly attached to the threaded cylindrical stud portion thereby attaching the through insert to the panel, a fastener is disposed through a hole in the object, into the stud cylinder aperture, and threaded into the floating nut disposed within the stud cylinder aperture attaching the object to the panel, and anti-rotation pin members extend from the base portion of the stud into the panel.

23. A method for securing an object to a panel comprising:
providing a panel, an object, and a through insert, the through insert comprising: a stud having a base portion and a threaded cylindrical stud portion mounted thereon, the threaded cylindrical stud portion comprising a stud cylinder aperture; and a cap having a top cap portion and a threaded cylindrical cap portion mounted thereon;

inserting the threaded cylindrical stud portion through a hole in the panel so that the base portion is abutted against a first side of the panel which is opposed to a second side of the panel;

extending anti-rotation pin members of the base portion of the stud into the panel;

placing a floating nut into the stud cylinder aperture so that the floating nut floats in the stud cylinder aperture;

disposing the cap on the second side of the panel and threadedly attaching the threaded cylindrical cap portion to the threaded cylindrical stud portion in the hole of the panel thereby locking the through insert to the panel with the base portion and the top cap portion disposed on opposite sides of the first and second sides of the panel; and extending a fastener through a hole in the object, into the stud cylinder aperture, and threadedly attaching the fastener to the floating nut disposed within the stud cylinder aperture between the first and second sides of the panel thereby attaching the object to the panel.

* * * * *